United States Patent [19]

Vanderhoef

[11] 4,312,174

[45] Jan. 26, 1982

[54] ROTARY LAWN MOWER

[75] Inventor: John Vanderhoef, Winnipeg, Canada

[73] Assignee: Canadiana Garden Products Inc., Brampton, Canada

[21] Appl. No.: 160,610

[22] Filed: Jun. 18, 1980

[51] Int. Cl.³ .......................................... A01D 35/26
[52] U.S. Cl. .................................... 56/320.2; 56/255
[58] Field of Search ................... 56/320.1, 320.2, 295, 56/255

[56] References Cited

U.S. PATENT DOCUMENTS

| | | | |
|---|---|---|---|
| B 494,167 | 3/1976 | Comer | 56/320.2 |
| 2,857,727 | 10/1958 | Cole | |
| 3,085,386 | 4/1963 | Slemmons | |
| 3,118,267 | 1/1964 | Shaw | 56/320.2 |
| 3,568,421 | 3/1971 | Smith et al. | 56/320.2 |
| 3,608,291 | 9/1971 | Kidd | 56/320.1 |
| 3,646,739 | 3/1972 | Dahl | 56/320.1 |
| 4,134,249 | 1/1979 | Wherker et al. | 56/255 |

Primary Examiner—Robert A. Hafer
Attorney, Agent, or Firm—Leon Arthurs; Kenneth M. Garrett

[57] ABSTRACT

A single bladed rotary lawn mower comprises a toroidal cutting chamber of gradually increasing height over the cutting zone, and abruptly decreasing height adjacent the end thereof. A top discharge port and a side discharge port separate therefrom is provided, one or both of which may be optionally closed whereby the lawn mower may be used in mulching, rear bagging or side discharge operation as desired.

17 Claims, 17 Drawing Figures

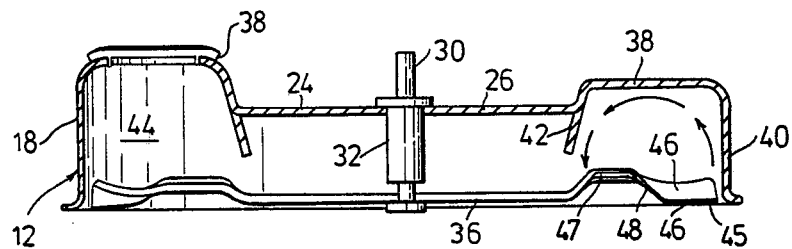
FIG. 4.
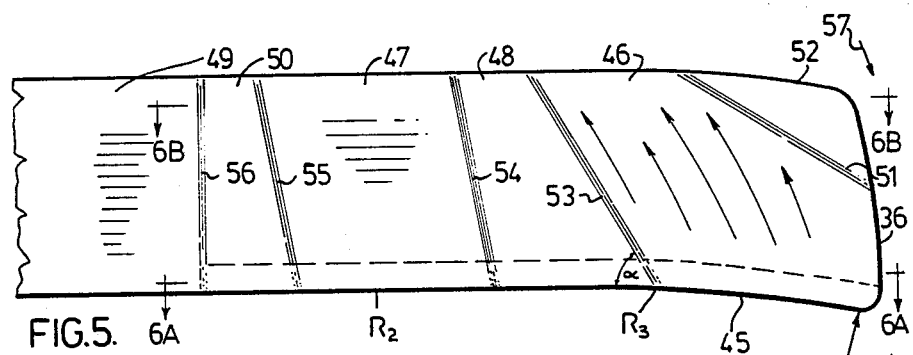
FIG. 5.
FIG. 6A.
FIG. 6B.
FIG. 7.

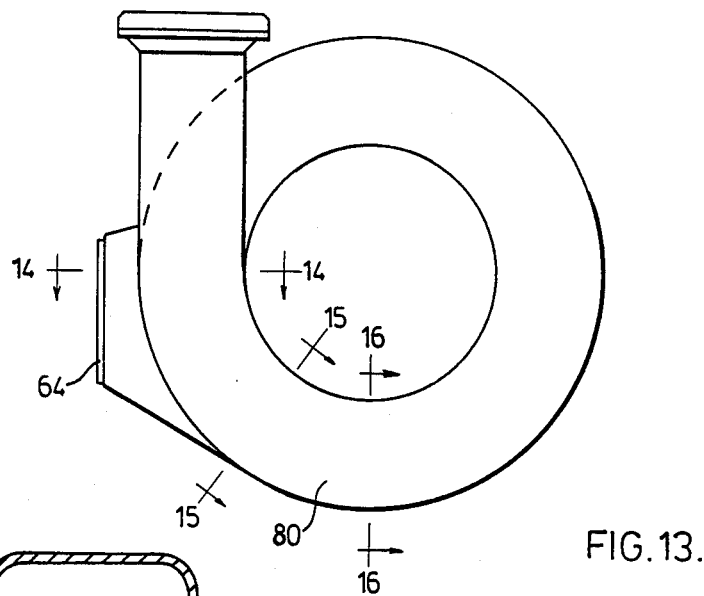
FIG.13.
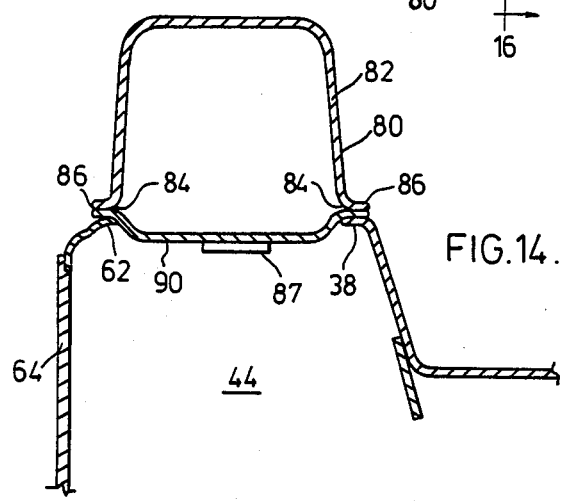
FIG.14.
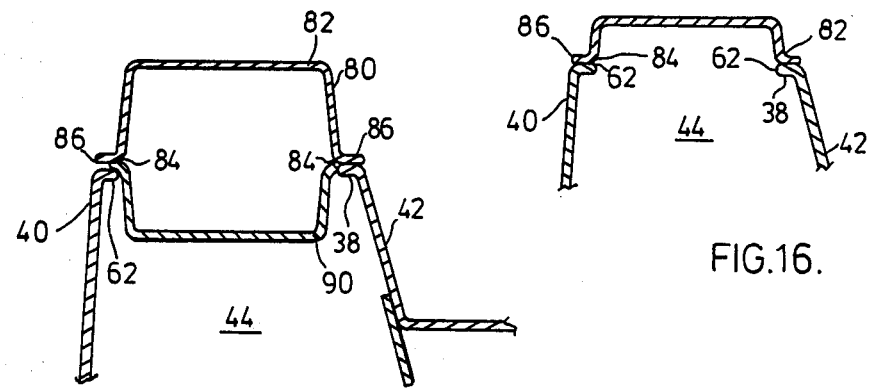
FIG.15.
FIG.16.

ROTARY LAWN MOWER

FIELD OF INVENTION

This invention relates to rotary lawn mowers. It particularly relates to lawn mowers of this type which are adapted for a plurality of different types of operation.

BACKGROUND OF INVENTION

Rotary lawn mowers as contemplated herein comprise a housing generally surrounding a cutting blade mounted for rotary movement therein in a horizontal plane. For reference purposes the housing may be considered to be divided in plan into a 360° interval, commencing where the forward facing cutting edge of the cutting blade is coincident with the central transverse axis of the lawn mower and incrementing in the direction of rotation of the cutting blade.

The cutting zone of the lawn mower is located in the angular interval 0°–180°, the cutting action being at a maximum at 90°. In conventional rotary lawn mowers of a first type the grass cuttings are discharged through a discharge opening provided in a side wall forming part of the housing located adjacent the end of the cutting zone and extending over an arc of about 30°. In rotary lawn mowers of a second type the grass-cuttings are discharged through a discharge opening provided in the top wall of the housing, and extending over the last part of the cutting zone, generally in the angular interval of about 90° to 180°. A discharge chute connects to the top discharge opening to conduct the grass cuttings to a collector bag located at the rear of the lawn mower.

It is well known to provide combination rotary lawn mowers which, by the use of suitable adapters, may be converted from one of the aforesaid types to the other. Such conversion poses relatively little problem, as the air flow patterns associated with the two types are not too dissimilar, with air being drawn into the housing from beneath the outer periphery thereof and expelled with the entrained cuttings through the discharge opening. Generally the cutting blade is adapted to function as an air propeller. Such cutting blade is normally planar, with each end thereof having an upturned portion so as to provide an upward air propelling surface.

More recently it has been proposed to provide rotary lawn mowers without discharge openings. Generally in such lawn mowers, grass cut in the angular interval 0°–180° is comminuted by the cutting blade, preferably in the angular interval 180°–360° so as to equalize the load on the blade, to form a fine mulch for deposition onto the mown grass surface beneath the housing. The air flow patterns within the housing differ appreciably in the chuteless rotary lawn mowers from those obtaining in rotary lawn mowers with discharge openings, generally requiring a cycling air flow to suspend and transfer the cuttings. Two somewhat different proposals for effecting mulching may be referenced. In U.S. Pat. No. 3,608,291, Kidd, dated Sept. 28, 1971 the housing has a top wall which is generally uniformly upwardly inclined over the angular interval of about 0°–180°, and generally uniformly downwardly inclined over the angular interval of about 180°–270°. Whilst the cutting blade is not shown, it may be understood to be of the aforedescribed type, i.e. generally planar with an upward air propelling surface adjacent each end thereof. The suspended cuttings are said to move upwardly in the expanded volume of the first 180° interval, to be deflected downwardly over the interval 180°–270° by the topwall, and intersect the blade to be comminated thereby in the interval 270°–360°. In U.S. Pat. No. 3,085,386, Slemmons, dated Apr. 16, 1963, a mulching lawn mower is described wherein the cutting blade and blade housing cooperate to provide a helical air flow pattern within the blade housing. The blade housing in such proposal is described as being semi-toroidal and of constant cross section so as to avoid any pressure changes within the housing. The cutting blade is provided with an upwardly inclined air directing surface adjacent the tip thereof, and a downwardly inclined air directing surface intermediate the axis of the cutting blade and the upwardly inclined air directing surface. This type of construction tends to maintain the grass cuttings in suspension whereby they may be subject to comminution by the cutting blade several times.

It is found that the capacity of mulching type lawn mowers to comminute grass cuttings to a fine mulch which may be dispersed into a mown lawn surface with aesthetically pleasing results is somewhat limited. In the early cutting season, when the grass growth is very vigorous and the moisture content is high, the cutting capacity is readily overloaded. It is therefore desirable to provide in a lawn mower the capability of discharging the cuttings from the blade housing prior to their being further comminuted to any appreciable extent so as to reduce the load on the cutting blade. The air flow pattern within the housing of mulching lawn mowers particularly of the second type employing a helical air flow path is not conducive to the efficient discharge of grass cuttings, and it is not believed that a practical arrangement has been known heretofore for a rotary lawn mower which may be optionally employed for mulching operations or for operation wherein grass cuttings are discharged through a side discharge or a top discharge chute as desired.

BRIEF SUMMARY OF INVENTION

It is then an object of this invention to provide a novel and practical arrangement for a rotary lawn mower which may be employed as desired for mulching operation or for operation wherein the grass cuttings are discharged optionally through a side discharge or a top discharge opening.

In accordance with one aspect of my invention, a rotary lawn mower includes a toroidal cutting chamber comprising a topwall and a pair of spaced apart side walls downwardly dependent therefrom. A cutting blade is mounted for rotary movement in a horizontal plane within the cutting chamber, the cutting blade having at each end thereof an upwardly air directing portion adjacent the tip and a downwardly air directing portion located inwardly of the tip. The outer side wall is provided with a discharge opening and a separate discharge opening is provided in the topwall, the discharge openings connecting directly with the cutting chamber in the cutting zone. Means is provided for selectively closing either or both openings. The topwall is generally upwardly inclined above the cutting zone, and relatively abruptly downwardly inclined adjacent the rear of the side discharge opening.

In accordance with a preferred aspect of the invention the topwall inclines uniformly upwardly over the angular interval of about 300° to about 180°, and uniformly downwardly over the angular interval of 180° to 210°.

In accordance with a further aspect of the invention the lawn mower includes a side discharge chute including walls which project within the cutting chamber to redirect air flow and grass cuttings therewith from the cutting chamber into the discharge chute.

In accordance with a still further aspect of the invention the lawn mower includes a top discharge chute which includes a forwardly opening scoop projecting within the cutting chamber to redirect the air flow therefrom into the chute. The upwardly inclined topwall of the cutting chamber serves also to direct air flow into the chute to improve the efficiency of operation thereof.

These and other objects, aspects and advantages of the invention will become more apparent from a consideration of a preferred embodiment of the invention and the following drawings relating thereto.

BRIEF DESCRIPTION OF THE DRAWINGS

FIG. 4 is a sectional view along ine 4—4 of FIG. 2 with a drive shaft added thereto;

FIG. 5 shows the cutting blade in plan view;

FIGS. 6A & 6B are sectional views on lines 6A and 6B of FIG. 5;

FIG. 7 shows in perspective view from below the side discharge chute for use with the lawn mower;

FIG. 13 is a plan schematic of the blade housing of the lawn mower with the chute of FIG. 12 in position, and FIG. 14, 15 & 16 show sections on lines 14, 15 & 16 of FIG. 13.

DESCRIPTION OF THE PREFERRED EMBODIMENT

Figure 1:
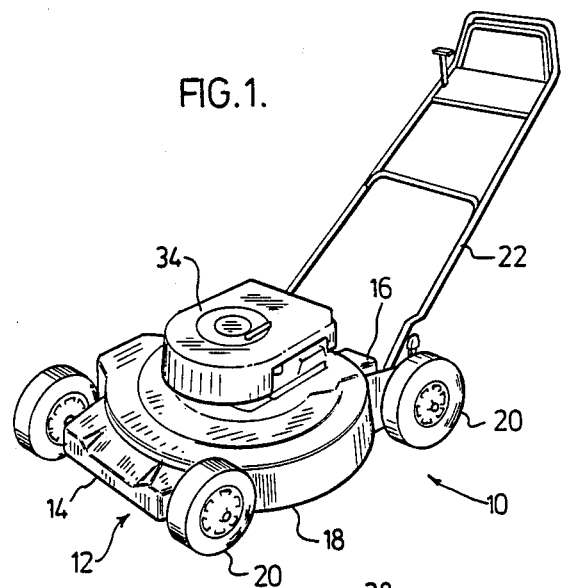
FIG. 1 is a general view in perspective of a lawn mower constructed in accordance with the invention.

Referring to the drawings in detail, FIG. 1 shows therein a rotary power lawn mower constructed in accordance with my invention and identified generally by the numeral 10. Lawn mower 10 comprises a deck 12 including a front apron 14 and a rear apron 16 integrally connected at the front and rear respectively of a blade housing 18, which aprons serve for mounting wheels 20 and handle 22.

Figure 2:
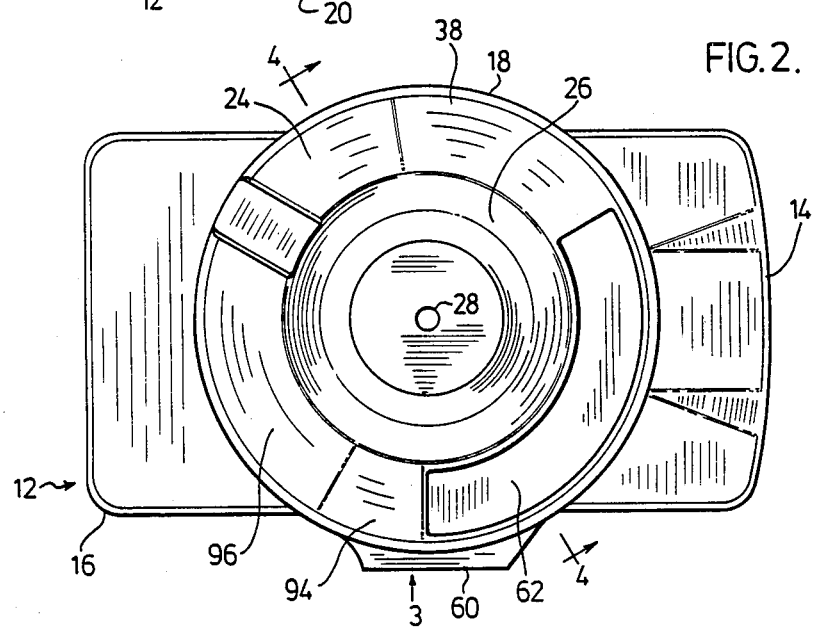
FIG. 2 is a plan view of the housing of the lawn mower of FIG. 1.
Figure 3:
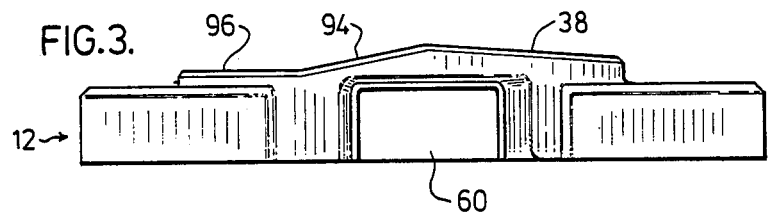
FIG. 3 is a side elevation of the housing in the direction of the arrow 3 of FIG. 2.

Referring also to FIGS. 2 and 4, blade housing 18 comprises a topwall 24 having a central portion 26 with a central aperture 28 therein. A drive shaft 30 is rotatably mounted on central portion 26 by any convenient means, here shown as bearing 32, which may be a part of an engine 34 to project downwardly through aperture 28. Whilst engine 34 is shown as being an internal combustion engine, it will be appreciated that other power means may be employed for driving drive shaft 30, for example an electric motor. A cutting blade 36 is secured to the end of drive shaft 30 located within blade housing 18.

Topwall 24 further comprises an annular portion 38 which circumscribes central portion 26 of the topwall. An outer skirt wall 40 is downwardly dependent from annular topwall portion 38 to generally circumscribe cutting blade 36. An inner skirt wall 42 generally coaxial with outer skirt wall 40 and spaced apart therefrom depends downwardly from annular topwall portion 38 to terminate a short distance above cutting blade 36, skirt walls 40, 42 and annular topwall portion 38 defining a toroidal cutting chamber 44. As thus far described, lawn mower 10 is of generally known structure.

As seen in FIGS. 5, 6A, 6B, cutting blade 36 comprises an upwardly inclined (i.e. inclining from the leading edge 45 towards the trailing edge) portion 46 adjacent the radial end of the blade, and a downwardly inclined portion 47 separated therefrom by a transitional portion 48. Central portions 49 of cutting blade 36 are not pitched, and are separated from portion 47 by another transitional portion 50. Leading edge 45 is sharpened to a chisel edge along portions 46, 47, 48 and 50. The radial tip of the trailing edge is folded upwardly at 51 to form a wing 52.

Cutting blade 36 has radial dimensions R1 and R2 at the tip and mid-point of portion 47 along the leading edge 45 thereof approximately equal to the radial dimension of outer skirt wall 40 and inner skirt wall 42 respectively. Transitional portion 48 is bounded by bend lines 53, 54, with bend line 53 intersecting leading edge 45 so as to have a radial dimension R3 about the average of radial dimensions R1 and R2. Transitional portion 50 is similarly bounded by bend lines 55, 56. Bend line 53 intersects leading edge 45 at an acute angle x, so that transitional cutting blade portion 48 is downwardly inwardly inclined. As cutting blade 36 rotates in the direction of arrow 57, air is propelled upwardly over surface 46 and inwardly by surface 52 in the direction of arrows 58, tending to be discharged from the trailing edge between the points of intersection of lines 51 and 53 therewith. This air stream is then captured and redirected downwardly by the under surfaces of blade portions 47 and 48, to create a helical air current generally centralized about the mid point of the leading edge of transitional portion 48. This mid point will generally have a peripheral speed of some 75% of that of the tip speed of cutting blade 36. It will be appreciated that the grass cuttings will be suspended in the helical air current. Such cuttings will normally be intersected several times by the cutting edge of the cutting blade, and due to its relatively high peripheral speed over the zone of intersection efficient comminution of the grass cuttings will result.

Figure 8:
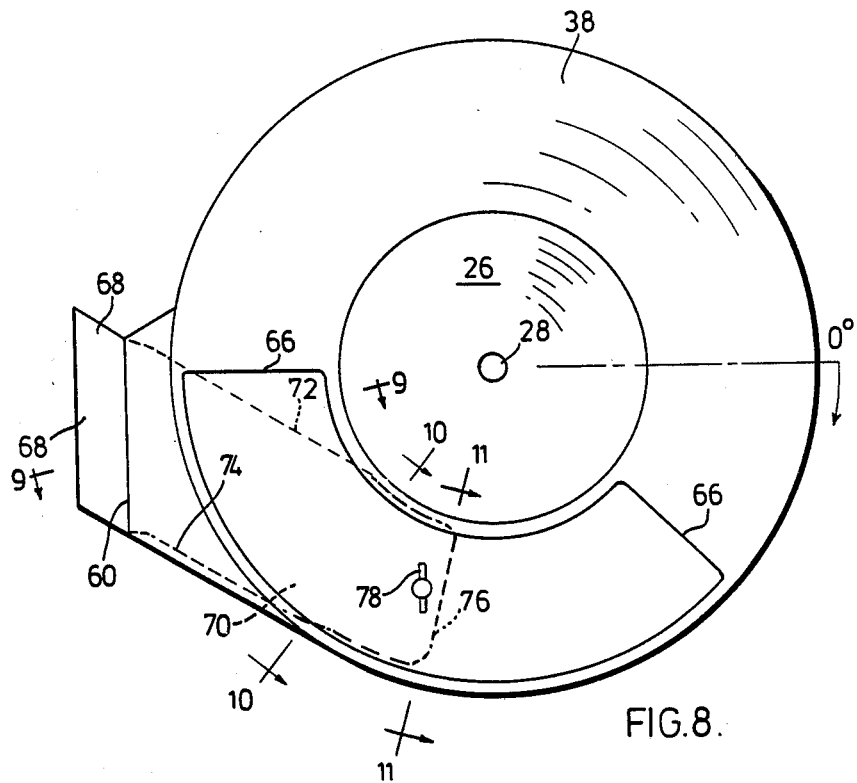
FIG. 8 is a plan schematic of the blade housing of the lawn mower with the chute of FIG. 7 in position in dashed outline where obscured.

For reference purposes blade housing 18 may be divided in plan into a 360° angular interval coincidentally with the central transverse axis of the blade housing and incrementing in the direction of rotation of the cutting blade 36 towards the forward portions of the blade housing, as shown in FIG. 8. The cutting zone of cutting blade 36 locates generally in the angular interval 0°–180°, with maximum cutting effect at 90°. When cutting chamber 44 is devoid of openings, the grass cuttings entrained in the helical air current within the cutting chamber will tend to move into the 180°–360° interval, where they will in large measure be comminuted as described above and drop to the ground. A certain proportion of the grass cuttings will tend to cycle around the cutting chamber.

Figure 9:
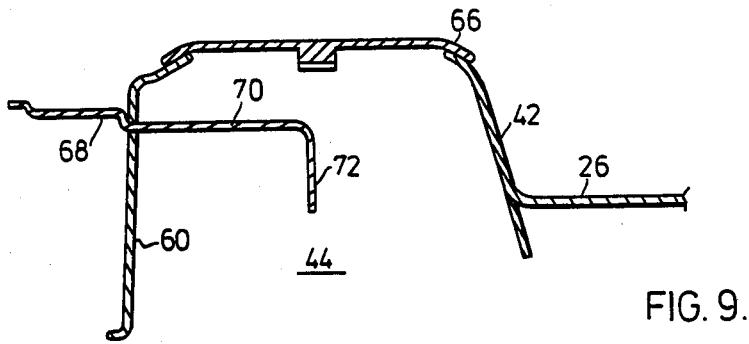
FIGS. 9, 10 & 11 are sections on lines 9, 10 & 11 of FIG. 8.
Figure 10:
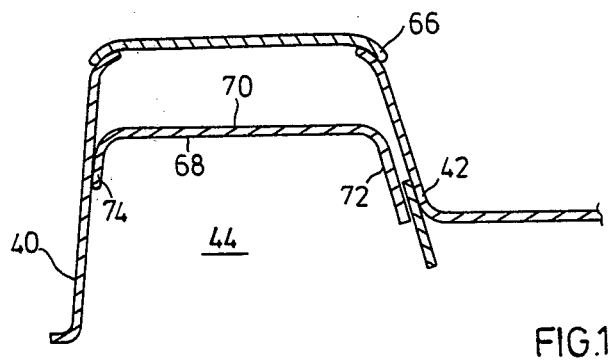
Figure 11:
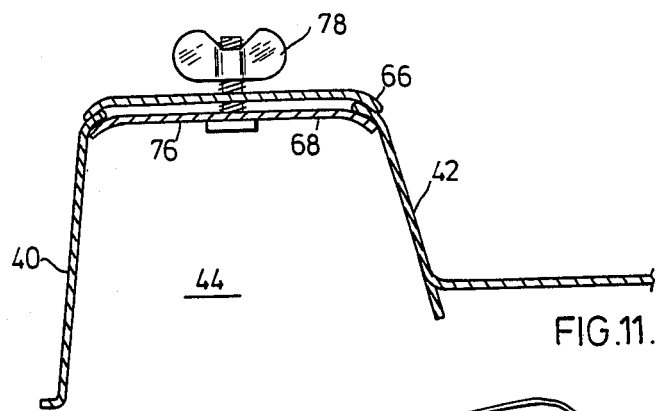
Figure 12:
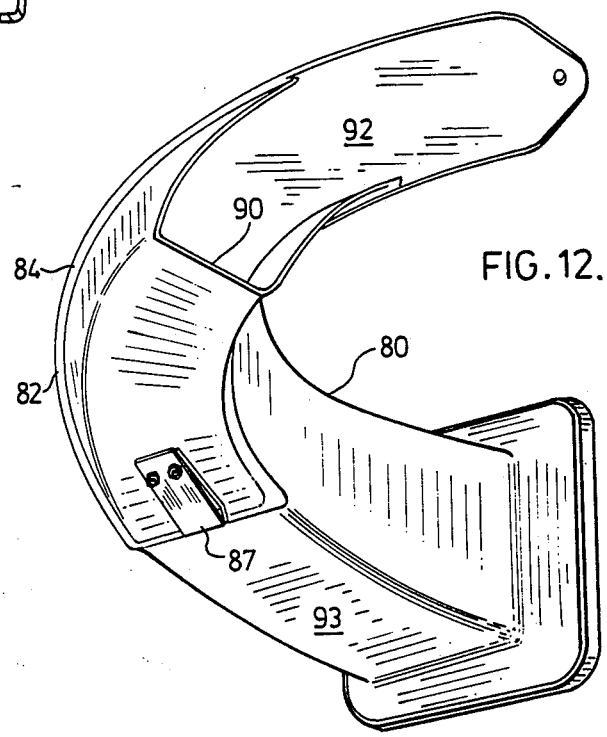
FIG. 12 shows in perspective a top discharge chute for use with the lawn mower.

Cutting chamber 44 is provided with a side discharge opening 60 generally vertically disposed in outer skirt wall 40 locating generally at the end of the cutting zone for the discharge of grass cuttings therethrough, and an arcuate, generally horizontally disposed top discharge opening 62 generally separate from side discharge opening 60 and located in annular portion 38 of topwall 24 generally superior to the latter part of the cutting zone. A detachable side discharge closure plate 64 seen in FIGS. 13 and 14 and a detachable top discharge closure plate 66 seen in FIGS. 11 and 12 are provided to selectively close the side discharge and top discharge openings respectively. Assuming the top discharge closure plate 66 to be secured in place and the side discharge closure plate 64 to be detached, it is found that the discharge of grass cuttings through side discharge opening 60 is not efficient. In order to increase the efficiency of discharge, I provide a side discharge chute 68 which is detachably positionable in the side discharge opening 60. As seen in FIG. 7, side discharge chute 68 includes an upper wall 70, and a pair of walls 72 and 74 downwardly depending therefrom, the three walls together forming in cross section taken generally parallel to the longitudinal axis of lawn mower 10 adjacent side discharge opening 60 an inverted U shape. As best seen in FIG. 8, side discharge chute 68 projects forwardly into cutting chamber 44, walls 70 and 72 acting to redirect the air flow and grass cuttings therein through the side discharge opening 60. Side wall 72, which is generally rearwardly disposed with respect to the cutting zone of blade housing 18, generally approaches inner side wall 42 tangentially, best seen in FIG. 8, to provide a smooth flow transition path into the chute. Upper wall 70 projects into the cutting chamber 44 a sufficient distance to approach topwall annular portion 38 (or, more precisely cover plate 66) at an angle of not more than about 10° to provide a smooth flow transition path. As may be seen from FIGS. 9 and 10, upper wall 70 is here separated from cover plate 66 by an appreciable clearance, in the preferred embodiment some 2-3 cms, where the top wall enters the cutting chamber. In order to provide the requisite smooth transitional approach to cover plate 66, upper wall 70 is extended in a tail portion 76 which is radially conformed to underlay the cover plate, the tail portion 76 and cover plate being secured together where contiguous by bolt and wingnut 78, seen in FIG. 11.

For operation of lawn mower 10 in a rear discharge mode side discharge opening 60 is closed by plate 64, and a top discharge chute 80 is connected to top discharge opening 62. Chute 80 is in the form of a volute horn of generally trapezoidal cross section. With reference to FIG. 12, chute 80 comprises wall structure 82 defining a generally planar opening 84 at the lower end thereof, the peripheral edges of which are generally coextensive with the peripheral edges of top discharge opening 62 in top wall portion 38. Opening 84 is surrounded by a flange 86 generally conformed to seat on and at least grossly seal to topwall portion 38 surrounding opening 62. Chute 80 may be retained in position by any convenient means, here comprising a tongue 87 which clips to the rearward peripheral edge of opening 62, and a bolt (not shown) which secures to topwall portion 38 forwardly of the front peripheral edge of opening 62. The efficiency of air flow transference, and of grass cuttings therewith, from cutting chamber 44 to chute 80 is increased by decreasing the angle of intersection of chute 80 with topwall portion 38. Generally speaking, for a given lawn mower the helix angle of the volute will be determined approximately by the type of grass collector to be used in conjunction with the lawn mower. The angle of intersection is here reduced by upwardly inclining topwall portion 38 in a helical spiral. Such spiral is developed over a substantial arc, generally at least coextensive with the cutting zone of the lawn mower, i.e. in the angular interval 0°-180°, so as to stabilize and direct an upwardly spiraling current of air and grass cuttings within this zone and provide a relatively smooth transitional flow path into chute 80 from the cutting chamber 44. As a further expedient which serves both to increase the path length over which the volute form of chute 80 is developed and also to form an air redirecting baffle within cutting chamber 44, the bottom and side walls of chute 80 are continued below the plane of opening 84 to form a soop 90. Scoop 90 has a forwardly opening entrance 92 thereto which defines the rearward limit to the entrance to chute 80. It is generally desirable that entrance 92 be situated at the rear of the cutting zone so as to permit the immediate exhaustion of grass cuttings from cutting chamber 44. Given the spatial limitations inherent in the design of lawn mower 10, it is impractical to provide a volute chute having a scoop entrance adjacent the rear of the cutting zone. I find that without scoop 90 there are significant pressure variations at the outlet of chute 80, which are manifested by the chute quickly becoming plugged with grass cuttings. When chute 80 is provided with scoop 90 however, and when the angle at which the chute intersects topwall portion 38 is limited, the pressure variations are reduced and good air flow within chute 80 is experienced. As a practical expedient, the entrance 92 of scoop 90 is located in a downwardly inclined plane in the angular interval 110° to 140°, which permits the immediate exhaustion of most of the grass cuttings from the cutting chamber, the remainder being comminuted and partially recycled for collection or adventitious deposition.

While it is found desirable for efficient top discharge operation of lawn mower 10 to provide an upward air flow within the cutting chamber 44 which may be more readily redirected into chute 80, it is preferred for mulching operation that the cutting chamber be of constant cross section. I find that when the upward helical path of topwall portion 38 extends over an angular interval which commences prior to the cutting zone, the pitch of topwall portion may be reduced while still providing good flow transference to chute 80. In practice the helical form of topwall portion 38 is developed over an arc of about 240°, extending over the angular interval 300° to 180°, and the upward pitch of the helix is maintained at about 3°. The angle at which chute 80 intersects topwall portion 38 is then about 15°, measured at the bottom wall 93 of the chute.

Considering further the function of lawn mower 10 in a mulching operation wherein side discharge opening 60 and top discharge opening 62 are closed respectively by plates 64 and 66 and the air current generated by cutting blade 36 is generally captive within toroidal cutting chamber 44, the upwardly inclined helical form of topwall portion 38 extending over the angular interval 300° to 180° establishes a relatively stable air flow path within this interval wherein the grass cuttings, particularly towards the end of the cutting zone, are maintained generally above the optimum level for intersection and comminution by cutting blade 36. This air flow path is disrupted by providing a relatively abrupt change in the profile of cutting chamber 44 by downwardly inclining topwall portion 38 at 94. Such downward incline is generally maintained over an arc of not more than about 45°; it is desirable that the arc be not less than about 20° so as to reduce the build up of grass cuttings on this top wall portion. In this embodiment the preferred value of the arc over which downwardly inclined portion 94 is formed is about 30°, locating in the angular interval of 180° to 210°. The pitch of downwardly inclined portion 94 will thus be about 20° to the horizontal, the pitch of the upwardly inclined portion and downwardly inclined portion of topwall 38 being generally in the ratio of the arcs over which the inclined portions are developed. Topwall portion 38 further includes a generally horizontal portion 96 which connects between the end of the downwardly inclined portion 94 and the beginning of the upwardly inclined portion. Portion 96 extends over an arc of at least about 75°, and preferably at least 90° as herein so as to permit the formation of a stable air path with this portion of the cutting chamber. The clearance between horzontal portion 96 and cutting blade 36 is such that the formed air flow path when considered in transverse section is intersected by the cutting blade at the intermediate portion 49 thereof so as to provide adequate comminution of grass cuttings in this portion of the cutting chamber.

Reverting to the side discharge operation of lawn mower 10 wherein top discharge opening 62 is sealed by plate 66, and wherein side discharge chute 68 is positioned in side discharge opening 60, it will be appreciated that while the baffles comprised by walls 70 and 72 of chute 68 redirect the air flow into the cutting chamber through chute 68, considerable leakage of air and grass cuttings past the baffles may be experienced. Such leakage is reduced by the restriction of the cutting chamber 44 by downwardly inclined wall portion 94 which generally overlaps the rear of discharge opening 60.

The above embodiment of the invention and its operation are fully described for illustrative purposes and are not to be taken as being restrictive of the invention, the scope of which is defined in the claims appended hereto.

I claim:

1. A rotary lawn mower adapted for multiple uses comprising a housing including a topwall and a pair of spaced apart skirt walls forming a toroidal cutting chamber, a cutting blade mounted for rotation within said cutting chamber, said cutting blade having oppositely directed air propelling surface portions formed to create a helical air current within the cutting chamber, said topwall being upwardly inclined at a small angle over an arc of between about 180° to about 270° terminating adjacent the end of the cutting zone of the cutting chamber, and abruptly downwardly inclined over an arc of between about 20° to about 45° commencing adjacent the end of the cutting zone, the outer of said skirt walls having a side discharge opening therein adjacent the end of the cutting zone, the topwall having an arcuately elongated opening therein separate from the opening in the skirt wall extending over an arc of at least about 90° terminating adjacent the end of the cutting zone, and means for selectively closing said discharge openings.

2. A rotary lawn mower in accordance with claim 1 wherein said topwall inclines uniformly upwardly over an arc of about 240°.

3. A rotary lawn mower in accordance with claims 1, or 2 wherein said topwall is uniformly inclined to the horizontal at a helix angle of about 3°.

4. A rotary lawn mower in accordance with claims 1, or 2 wherein said lawn mower inclines uniformly downwardly at a helix angle of about 20°.

5. A rotary lawn mower in accordance with claim 1 including a side discharge chute positioned in said side discharge opening, said side discharge chute including wall means projecting into said cutting chamber within said cutting zone to redirect air flow therefrom through said side discharge chute.

6. A rotary lawn mower in accordance with claim 5 wherein said wall means includes a rearwardly disposed side wall which approaches the inner skirt wall generally tangentially.

7. A rotary lawn mower in accordance with claim 5 or 6 wherein said wall means includes an upper wall connected to said side wall along the upper edge thereof and wherein terminal portions of said upper wall are shaped to conform to said topwall and are detachably secured thereto.

8. A rotary lawn mower in accordance with claim 6 wherein said sidewall decreases in height on traversing said cutting chamber from said discharge opening.

9. A rotary lawn mower in accordance with claim 1 including a top discharge chute located over said top discharge opening, said top discharge chute including a flange portion generally circumscribing said top discharge opening and seating a said topwall and a scoop projecting downwardly beneath said flange into said cutting chamber to redirect air flow within said cutting chamber into said chute.

10. A rotary lawn mower in accordance with claim 9 wherein said top discharge opening extends over an arc of about 120°.

11. A rotary lawn mower in accordance with claim 9 wherein the entrance to said scoop locates intermediate the end and the mid point of the cutting zone.

12. A rotary lawn mower in accordance with claim 11 wherein the entrance to said scoop is downwardly rearwardly angled.

13. A rotary lawn mower in accordance with claim 9 wherein said chute intersects the upwardly inclined portion of said topwall at an angle not greater than about 30°.

14. A rotary lawn mower in accordance with claim 9 wherein said angle is about 15°.

15. A rotary lawn mower in accordance with claim 8, 9 or 12 wherein said chute is helically formed.

16. A rotary lawn mower as defined in claim 1 wherein said oppositely directed air propelling surfaces of said cutting blade are separated by a downwardly inwardly inclined portion.

17. A rotary lawn mower as defined in claim 16 wherein the tip of the cutting blade adjacent the trailing edge is upwardly inclined.

* * * * *